US012097628B2

(12) United States Patent
Gallegos

(10) Patent No.: US 12,097,628 B2
(45) Date of Patent: Sep. 24, 2024

(54) MULTI-PURPOSE UTILITY CUTTER

(71) Applicant: Slice, Inc., Sunny Isles, FL (US)

(72) Inventor: Robert Joseph Gallegos, Fremont, CA (US)

(73) Assignee: Slice, Inc., Sunny Isles, FL (US)

( * ) Notice: Subject to any disclaimer, the term of this patent is extended or adjusted under 35 U.S.C. 154(b) by 304 days.

(21) Appl. No.: 17/701,636

(22) Filed: Mar. 22, 2022

(65) Prior Publication Data

US 2023/0302670 A1 Sep. 28, 2023

(51) Int. Cl.
*B26B 17/00* (2006.01)
*B25B 7/08* (2006.01)

(52) U.S. Cl.
CPC ................ *B26B 17/00* (2013.01); *B25B 7/08* (2013.01)

(58) Field of Classification Search
USPC ........................................................... 30/186
See application file for complete search history.

(56) References Cited

U.S. PATENT DOCUMENTS

| | | | | | |
|---|---|---|---|---|---|
| 2,295,385 | A * | 9/1942 | Connors | A01G 3/02 | 30/186 |
| 3,772,783 | A * | 11/1973 | Averitt | B26B 17/00 | 30/186 |
| 6,260,279 | B1 * | 7/2001 | Apolinski | B26B 17/00 | 30/341 |
| 8,327,548 | B2 * | 12/2012 | Ronan | B26B 17/00 | 30/186 |
| 2005/0050735 | A1 * | 3/2005 | Huang | B26B 17/00 | 30/186 |
| 2023/0302670 | A1 * | 9/2023 | Gallegos | B25B 7/08 | |

* cited by examiner

*Primary Examiner* — Hwei-Siu C Payer
(74) *Attorney, Agent, or Firm* — McCarter & English, LLP; James M. Smedley; Alex Korona

(57) ABSTRACT

The present invention is a multi-purpose utility cutter apparatus having two body members rotatably connected at a pivot point to form two jaw portions and two handles, with at least one of the jaw portions formed with a blade holding mechanism.

20 Claims, 4 Drawing Sheets

MULTI-PURPOSE UTILITY CUTTER

FIELD OF THE INVENTION

The present invention generally relates to a multi-purpose cutter. Specifically, embodiments of the present invention relate to a multi-purpose utility cutter apparatus having a two body members rotatably connected at a pivot point to form two jaw portions and two handles, with at least one of the jaw portions formed with a blade holding mechanism.

BACKGROUND

Typically, edge cutters, shears and similar utility cutter type devices are configured with fixed blades. In some scenarios, similar devices may be configured with exchangeable blades, however, exchanging blades for those devices may be a cumbersome task requiring the use of tools. Moreover, these prior developed devices may not be compatible with a plurality of blades (e.g., universal) with different blade profiles (e.g., round or angled edges) or thicknesses.

Therefore, there is a need in the art for a utility cutter that incorporates an improved blade securement mechanism. These and other features and advantages of the present invention will be explained and will become obvious to one skilled in the art through the summary of the invention that follows.

SUMMARY OF INVENTION

A multi-purpose utility cutter is described herein. The multi-purpose utility cutter may combine several different cutting functions in a single tool. For example, the utility cutter may be utilized for cutting plastic, polyvinyl chloride (PVC), vinyl, and rubber tubing, vinyl tiles, cardboard and similar materials. The utility cutter may comprise two body members attached at a pivot point and two jaw portions. The jaw portions may move open and closed when the body members open and close, which may facilitate cutting functions. In some embodiments, one jaw member may comprise a blade channel. In some examples, one of the body members may include a blade drawer for blade storage.

DETAILED SPECIFICATION

Figure 1:
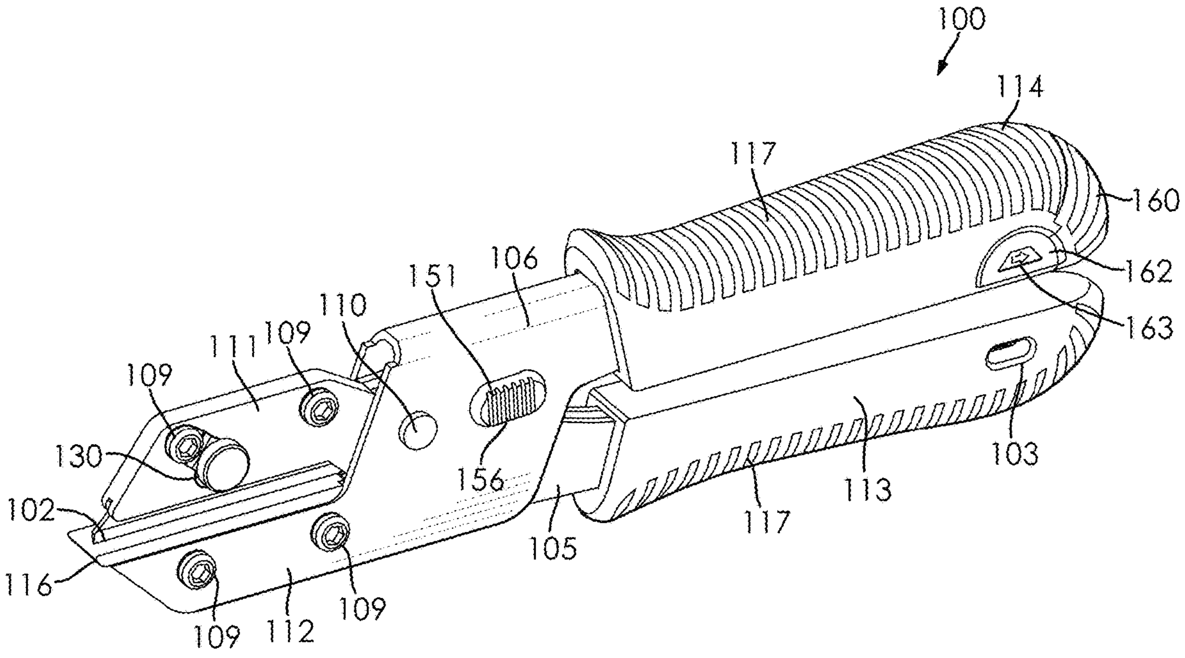
FIG. 1 shows a perspective view of an exemplary multi-purpose utility cutter in an exemplary closed position in accordance with an embodiment of the present invention.

The present invention generally relates to a multi-purpose utility cutter. Specifically, embodiments of the present invention relate to a multi-purpose utility cutter apparatus with a novel blade holding mechanism.

In accordance with embodiments of the present invention, the blade holding mechanism of the utility cutter may be compatible with a plurality of blades (e.g., universal) with different blade profiles (e.g., round or angled edges) or thicknesses. In some examples, the blade holding mechanism may be configured to dedicated for use with a particular type of blade or blade types, for example, ceramic blades, for example, ceramic blades produced by a particular or dedicated manufacturer. In some scenarios, the ability for the blade holding mechanism to receive and/or secure blades of different sizes and/or thicknesses may be desired, especially in connection with ceramic blades. For example, the brittleness properties of ceramic may need to be considered when a blade type is being chosen for completion of a particular task. For example, cutting a section of hard material such as acrylic tubing may be difficult and may shatter a thin ceramic blade. In that scenario, for example, a thicker ceramic blade may be preferable. On the other hand, a thicker ceramic blade may not be suitable to cut through a material such as a dense foam or rubber, and a thinner ceramic blade may be preferred. In some scenarios, the ability for the blade holding mechanism to hold or retain ceramic blades of varying thicknesses in this manner may be important because ceramic blades are not as malleable as metal blades, and users may need to be able to retain blades of varying thicknesses for different tasks (e.g., to accomplish various tasks).

In accordance with embodiments of the present invention, a multi-purpose utility cutter may comprise two body members attached at a pivot point and two jaw portions. In some examples, at least one jaw portion may comprise a blade holder. Certain embodiments of the present invention may include fewer components or additional components depending on the utilization and purpose for the safety cutter.

In accordance with embodiments of the present invention, the blade holding mechanism of at least one of the jaw portions may comprise a blade channel and a blade clamping mechanism. In some embodiments, one or more handles of the utility cutter may comprise a blade drawer for blade storage.

In accordance with embodiments of the present invention, the multi-purpose utility cutter may comprise two body members connected together at a pivot point to establish two opposing jaw portions and two opposing handles, one on each side of the pivot point. The handles may have a grip portion which may be formed of a material suitable for secure and comfortable gripping, for example, a silicone material. In some scenarios, the grip portion may be textured, for example, may be formed with a plurality of ridges configured to support user grip. In any embodiment, the textured area may be any similarly suitable texture configured to support user grip. The body members may further comprise a position locking mechanism configured to lock the jaw portions and/or the handles in place, for example, to lock or unlock the body members from an open or closed position.

In accordance with embodiments of the present invention, the utility cutter may comprise two jaw portions. The jaw portions may extend from the pivot point and may substantially oppose one another. In some examples, a first jaw portion may comprise a blade holding mechanism and a second jaw portion may comprise a platform portion. The platform portion may be substantially flat or may be formed with ridges or jagged edges, for example, to support the gripping of materials to be cut, for example, cardboard, vinyl, rubber and/or plastic materials including in the form of tiles, tubing and/or wires.

In accordance with embodiments of the present invention, a blade holding mechanism may be disposed or formed on a jaw portion of the utility cutter. The blade holding mechanism may comprise a blade channel having at least two interior side walls, with at least one side wall formed with one or more openings, a screw member (e.g., a thumbscrew fastener), a screw member platform implement, a stopper member, and a clamping member (e.g, a clamping plate or disc). In some examples, the screw member may comprise a knob portion and a shaft portion. At least a portion of the shaft portion may be threaded. The knob portion may be configured similar to a thumbscrew fastener, for example, having shaped cavities and protrusions (e.g., ridges) on the knob member that allows torque to be applied to the thumbscrew fastener to support manual fastening of the thumbscrew fastener. In some examples, the knob portion may comprise one or more textured areas, for example, an area comprising a plurality of ridges to support user grip, for example, on or around the circumference or perimeter of the knob portion to aide users in rotating (e.g., manually rotating) the knob portion. In some examples, the side walls of the blade channel may be formed with at least one opening. For example, the blade channel may be comprise two side walls, each of which may comprise at least one opening. In some examples, an opening in a first side wall of the blade channel may substantially correspond to (e.g., may substantially oppose) an opening in a second side wall of the blade channel. In some scenarios, the shaft portion of the screw member may be introduced into the openings in the blade channel side walls, for example, with at least a threaded portion of the shaft portion engaged and rotatable with respect to a corresponding threaded portion formed on an interior portion of the one or more blade channel side wall openings. In some examples, the screw member may be formed with the stopper member and may abut the screw member platform implement, and may travel through the clamping plate and at least a first opening in the blade channel. At least one of the interior side walls of the blade channel may be configured to abut a blade.

In accordance with embodiments of the present invention, at least one of the handles of the utility cutter may comprise a blade drawer. The blade drawer may be disposed on or formed with a handle. The blade drawer may be configured to eject from a tip portion of the handle, and may be configured to retain one or more blades or similar cutting members for storage. In some examples, the blade drawer may be formed with a slot formed in the shape of a blade or cutting member which may be configured to substantially retain and/or secure a blade for storage purposes. In some scenarios, the inner surface of the blade drawer may include one or more protruding portions configured to abut a blade or other cutting member placed in the blade drawer for storage. It is contemplated that the blade drawer may hold and/or secure at least one or multiple blades at a time. In some examples, the blade drawer may be formed of substantially the same material as a blade handle, for example, silicone, and may be configured to slidably engage with an opening in the blade drawer. In some examples, the blade drawer may be partially or fully ejectable.

In accordance with embodiments of the present invention, a blade holding mechanism may comprise a blade holder comprising a blade channel formed with a clamping disc receiving hole and adapted to receive a blade, a screw member comprising a knob portion and a shaft portion comprising a stopper member and a threaded portion, and a clamping disc having an opening adapted to receive the shaft portion of the screw member to permit the clamping disc to travel along the shaft portion of the screw member. In some embodiments, the clamping disc may selectively travel through the clamping disc receiving hole (e.g., may be movable within the clamping disc receiving hole). In some examples, the screw member may be formed with the stopper member which may be positioned between the threaded portion and the knob portion of the screw member. In some embodiments, an internal face of the clamping disc may be configured to selectively abut a portion of the blade in the blade holder to secure the blade to the blade channel. In some examples, the position of the stopper may be adjustable relative to the blade channel such that the stopper member may be directed towards at least a first stopper position wherein the stopper compresses against the clamping disc to secure a blade within the blade channel. In some embodiments, rotation of the screw member may direct the stopper towards the clamping disc and the clamping disc towards an opposing interior sidewall of the blade channel to clamp a blade disposed in the blade holder.

In accordance with embodiments of the present invention, a blade holding mechanism may comprise a blade holder comprising a first channel member opposing a second channel member to form a blade channel adapted to receive a blade, each channel member formed with one or more clamping mechanism receiving holes, and a clamping mechanism comprising a screw member comprising a knob portion and a shaft portion comprising a stopper member and a threaded portion, the shaft portion adapted to travel through at least one clamping mechanism receiving hole in each of the channel members, and a clamping disc having an shaft portion opening configured to permit the clamping disc to travel along the screw member shaft portion. In some examples, the shaft portion threaded portion may be adapted to threadably engage with the second channel member receiving hole. In some embodiments, rotation of screw member and engagement of the shaft portion threaded portion and the second channel member receiving hole may direct the stopper member of the shaft portion towards the second channel member to direct the clamping disc towards the second channel member to clamp a blade disposed in the blade holder. In some embodiments, a screw platform implement may be disposed between the knob portion and the stopper member of the screw member and may be configured to prevent the threaded portion of the shaft portion from unthreading from the second channel member receiving hole. In some examples, the stopper member of the shaft portion may direct movement of the clamping disc through a receiving hole in the first channel member and towards the second channel member. In some examples, rotation of the knob member may direct the clamping disc to abut a portion of the blade disposed in the blade channel to secure the blade within the blade channel. In some examples, compression of the clamping disc against a portion of the blade may prevent movement dislodgement of the blade from within the blade channel. In some embodiments, the clamping disc may be of a sufficient thickness to maintain contact with an internal portion of the first channel member receiving hole while the clamping disc clamps the blade disposed in the blade channel. In some embodiments, an internal sidewall of the blade channel comprises one or more protruding elements adapted to mate with one or more indents formed on a spine side of the blade.

In accordance with embodiments of the present invention, a multi-purpose tool may comprise a pair of body members rotatably connected at a pivot point to form a pair of jaw portions and a pair of handles, with at least one of the jaw portions formed with a blade holding mechanism which may comprise a blade holder comprising a first channel member opposing a second channel member to form a blade channel adapted to receive a blade, each channel member formed with one or more receiving holes, a screw member comprising a knob portion and a shaft portion comprising a stopper member and a threaded portion and a clamping disc having a shaft portion opening configured to permit the clamping disc to travel along the screw member shaft portion. In some embodiments, the clamping disc may be movably disposed on the screw member between the stopper member and the threaded portion of the shaft portion. In some embodiments, the stopper member may direct movement of the clamping disc through a first channel member receiving hole and towards the second channel member. In some embodiments, rotation of the knob member may direct the stopper member towards the clamping disc to move the clamping disc to compress a portion of the blade disposed in the blade channel to secure the blade within the blade channel. In some embodiments, the clamping disc may be of a sufficient thickness to maintain contact with an internal portion of the first channel member receiving hole while the clamping disc clamps the blade disposed in the blade channel.

In accordance with an exemplary usage scenario, the utility cutter of the present disclosure may be utilized to cut materials, including tough materials such as multiple sheets of paper, silicon, rope (nylon), hose, leather, rubber, rubber molding, plastic, plastic wiring, rubber wiring, copper pipe, copper wiring, plastic, etc.

In accordance with embodiments of the present invention, the blade holding mechanism of the utility cutter may be configured to accommodate multiple styles of blades (e.g., universal). In some scenarios, the clamping mechanism may be configured to secure multiple styles of blades within the blade holding mechanism of the utility cutter. In some scenarios, the blade holding mechanism may be configured to hold and/or retain a particular style of blade. For example, an internal portion of the blade holding mechanism may comprise one or more protruding features (e.g., keying features), for example, four protruding features which may be configured to mate with (e.g., key into) four slot features (e.g., four u-shaped slot features) formed on the spine of a blade, for example, a ceramic blade.

Figure 6:
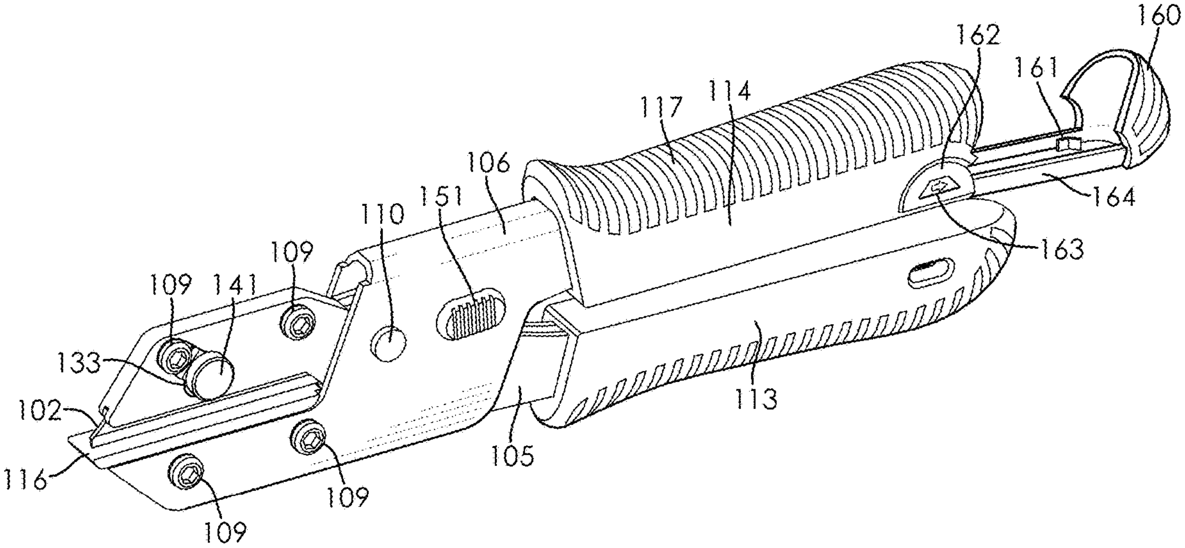
FIG. 6 shows a perspective view of an exemplary multi-purpose utility cutter with a blade drawer ejected from a handle in accordance with an embodiment of the present invention.
Figure 7:
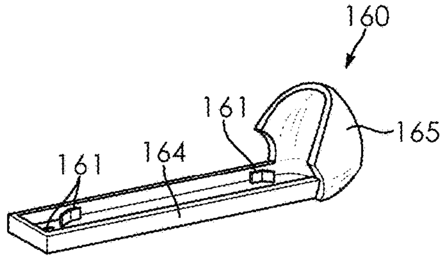
FIG. 7 shows a perspective view of an exemplary blade drawer in accordance with an embodiment of the present invention.
Figure 8:
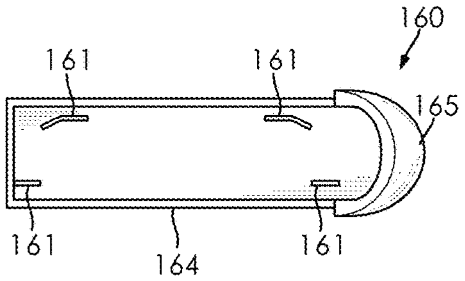
FIG. 8 shows a top view of an exemplary blade drawer in accordance with an embodiment of the present invention.
Figure 9:
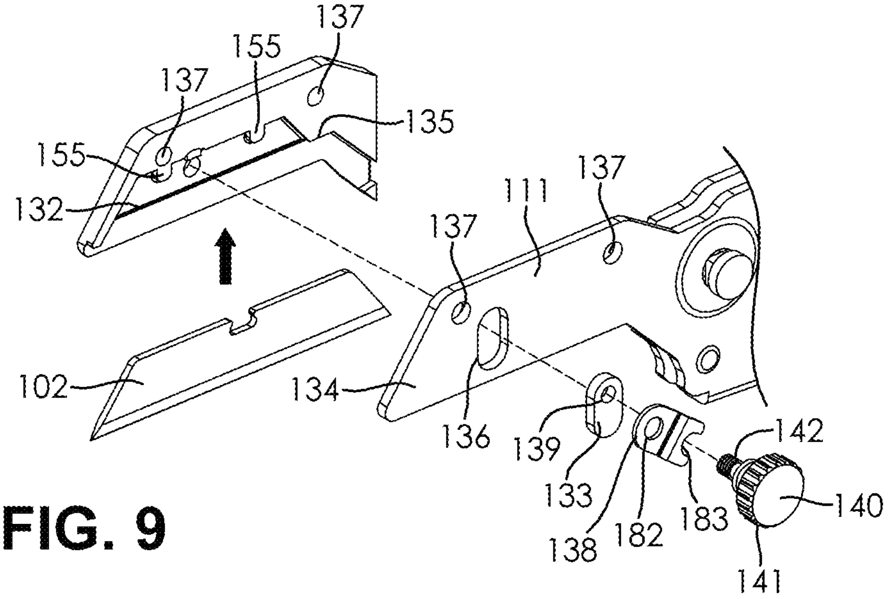
FIG. 9 shows a front exploded view of at least a portion of an exemplary blade holding mechanism in accordance with an embodiment of the present invention.
Figure 10:
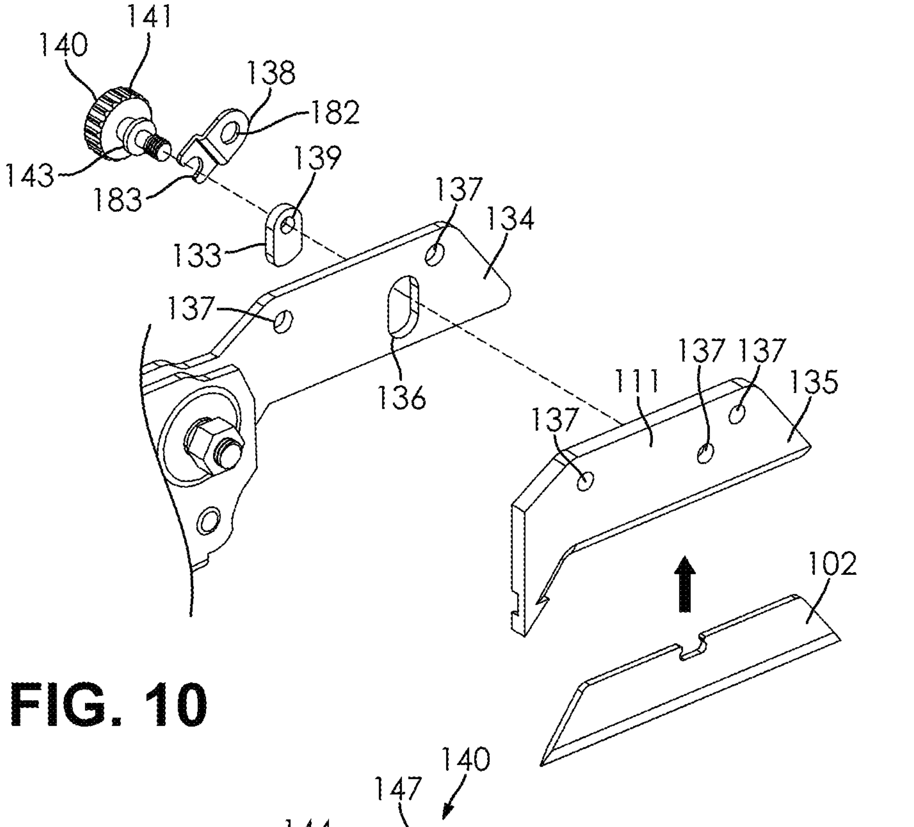
FIG. 10 shows a rear exploded view of at least a portion of an exemplary blade holding mechanism in accordance with an embodiment of the present invention.
Figure 11:
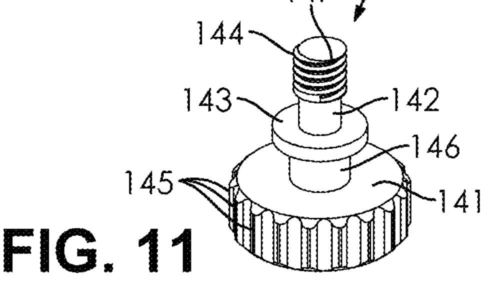
FIG. 11 shows a perspective view of an exemplary screw member of a multi-purpose tool in accordance with an embodiment of the present invention.

Turning now to the figures, FIGS. 1-6 generally depict an exemplary multi-purpose utility cutter in accordance with embodiments of the present invention. FIGS. 7-8 generally depict an exemplary blade drawer in accordance with embodiments of the present invention. FIGS. 9-10 respectively generally depict front and rear exploded views of at least a portion of an exemplary blade holding mechanism in accordance with embodiments of the present invention. FIG. 11 depicts an exemplary screw member in accordance with embodiments of the present invention.

As shown in FIGS. 1-6 a multi-purpose utility cutter 100 may comprise two body members 105 and 106 rotatably connected at a pivot point 110 to form two jaw portions 111, 112 and two handles 113, 114. In some examples, one of the jaw portions, for example, jaw portion 111 may comprise a blade holding mechanism 130 and jaw portion 112 may comprise a platform member 116. In some examples, one of the handles, for example, handle 114, may be formed with a blade drawer opening configured to receive a blade drawer 160.

As further shown in FIGS. 1-6, a multi-purpose utility cutter 100 may comprise a pair of handles 113, 114, a pair of jaw portions 111, 112, a pivot point 110, a blade holding mechanism 130, and a locking mechanism 150. In some examples, one of the handles, for example, handle 113, may be formed with an opening 103 configured to receive an attachment means, for example, a keychain, lanyard, string, rope, chain, or any other similarly suitable means for attaching the multi-purpose utility cutter to another object. As shown in the depicted example, in some embodiments, the handles 113, 114 may be formed with textured areas to support user grip. In some scenarios, the textured areas may be a plurality of ridges 117. In some embodiments, jaw portion 111 may be configured to travel through an opening in jaw portion 112, for example, at or near pivot point 110. In some examples, the jaw portions 111, 112 may be connected at or near a pivot point 110 by a pivot mechanism, for example, a screw fastener and a nut member, as shown in the illustrated example. In any embodiment, any similarly suitable mechanism may be utilized to permit rotation or pivoting of a first jaw portion, for example, jaw portion 111, relative to a second jaw portion, for example, jaw portion 112.

Figure 2:
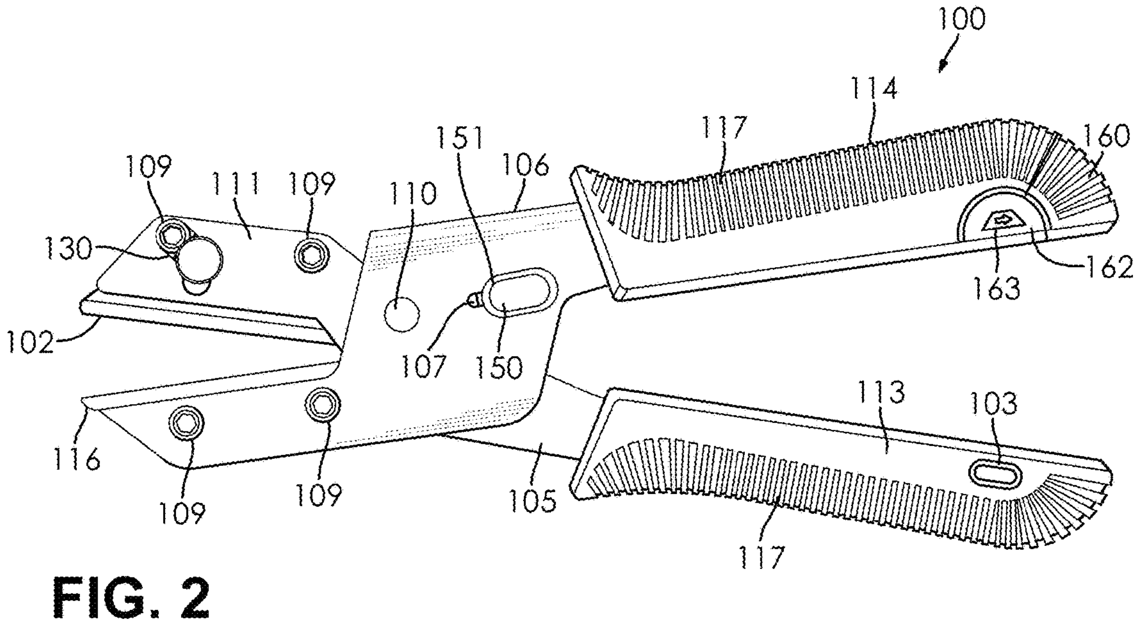
FIG. 2 shows a front view of an exemplary multi-purpose utility cutter in an exemplary open position in accordance with an embodiment of the present invention.
Figure 3:
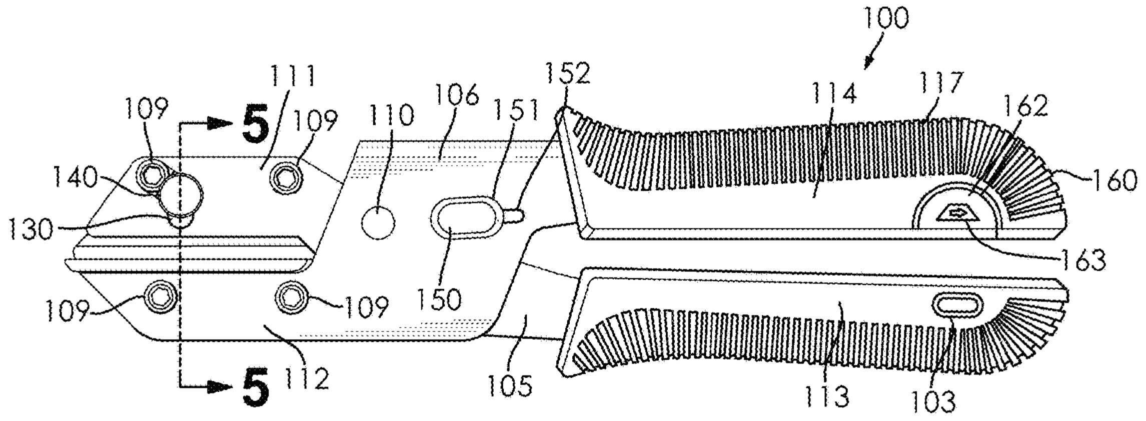
FIG. 3 shows a front view of an exemplary multi-purpose utility cutter in an exemplary closed position in accordance with an embodiment of the present invention.
Figure 4:
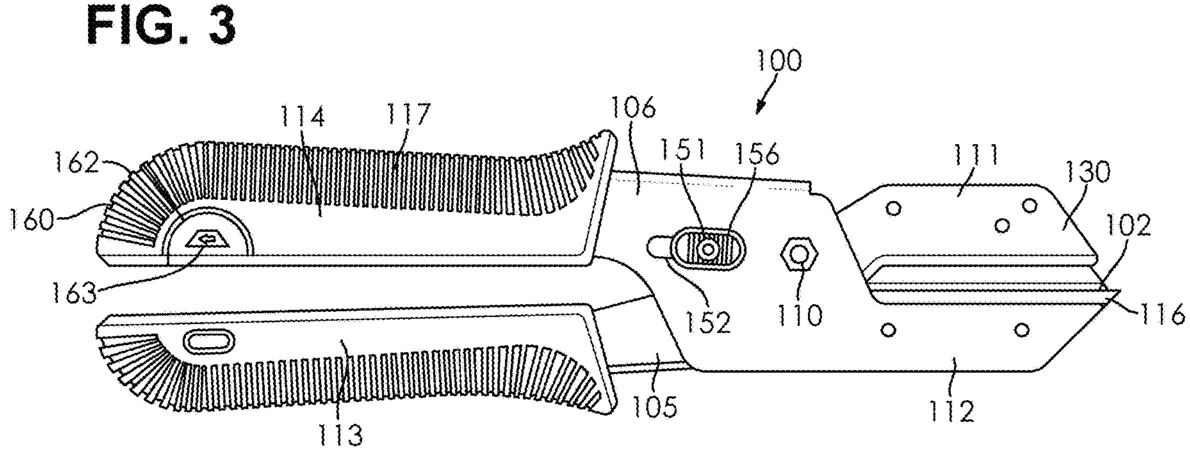
FIG. 4 a rear view of an exemplary multi-purpose utility cutter in an exemplary closed position in accordance with an embodiment of the present invention.
Figure 5:
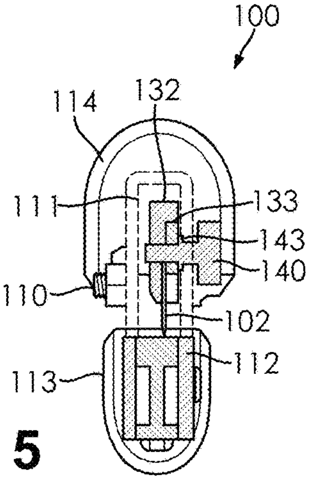
FIG. 5 shows a cross sectional view taken along the 5-5 line shown in FIG. 3 of an exemplary multi-purpose utility cutter in accordance with an embodiment of the present invention.

In accordance with embodiments of the present invention, the jaw portions 111 and 112 may be configured to open and close. For example, the jaw portions 111 and 112 may be moved to an open (e.g., expanded) position (as shown in FIG. 2), wherein the jaw portions 111, 112 are spaced apart, to enable a user to insert a material for cutting between a blade 102 disposed in the blade holding mechanism 130 of a first jaw portion and the platform member 116 of a second jaw portion. In some examples, the jaw portions 111, 112 may be moved to a closed (e.g. compressed or clamped) position, wherein the jaw portions 111, 112 are drawn towards one another (e.g., moved towards one another), to cut or clamp a material placed between a blade 102 disposed in the blade holding mechanism 130 of a first jaw portion and the platform member 116 of a second jaw portion. In some scenarios, in the closed position, a blade 102 disposed in the blade holding mechanism 130 may abut the platform member 116 of jaw portion 112, for example, if no material is placed between the jaw portions 111 and 112, or if, for example, the material has been successfully cut by the cutter 100. In some examples, the relative positions of the jaw portions 111, 112 may be locked, for example, in a closed position (as shown in FIG. 1), wherein the jaw portions 111, 112 are substantially adjacent to one another (e.g., portions thereof touch), to support the cutting or clamping of a material placed between a blade 102 disposed in the blade holding mechanism 130 of a first jaw portion and the platform member 116 of a second jaw portion.

In accordance with embodiments of the present invention, a tension component may be disposed in either or both of the body members 105 and 106 and may be configured to bias the handles 113 and 114 and/or the jaws 111 and 112 to an open position (as shown in FIG. 2). In any embodiment, the tension component may be a spring, a leaf spring or any other similarly suitable tension component configured to bias the handles 113 and 114 and/or the jaws 111 and 112 to an open position. In some examples, a force (e.g., user force) may be applied to the handles 113 and 114 to direct the handles 113 and 114 and/or the jaw portions 111 and 112 to the closed position.

In accordance with embodiments of the present invention, a position locking mechanism 150 may be configured to selectively lock and unlock the jaw portions of the multi-purpose utility cutter 100, for example, jaw portions 111 and 112 of the multi-purpose cutter 100. In some embodiments, the position locking mechanism 150 may comprise a switch member 151 having one or more textured areas, for example, one or more ridges 156, to support user grip and a switch slot 152 and/or a switch groove. In some examples, the switch slot 152 may be formed in or otherwise disposed on body member 106. In some examples, the switch groove may be formed in or otherwise disposed on a body member 105. In some examples, the switch member 151 may comprise two button portions for example, a first button portion opposing and connected to a second button portion by a connection component, for example, a post component which may connect to one or more of the first button portion and/or second button portion by one or more screw fasteners or any similarly suitable connection means, including pins, glues or any other adhesives or combinations thereof. In some examples, the connection component may be configured to travel along the switch slot 152 and/or into the switch groove. In some examples, the switch slot 152 may form a movement boundary for the connection component and/or the switch member 151. In some examples, movement of the switch member 151 within the switch slot 152 may be selectively limited, for example, when the handles 113 and 114 are in the open position, for example, when the device 100 is biased to the open position by the tension component. In some examples, the switch slot may be formed on a front and/or a rear side of a body member 106. In some examples, when the handles are in the closed (e.g., compressed or clamped) position, wherein the jaw portions 111 and 112 are drawn together, the switch member 151 may be moved within the switch slot in body member 106 and into the switch groove in body member 105. For example, when the handles 113 and 114 are moved together, the switch slot 152 and the switch groove may align to permit movement of the slider switch 151. In some scenarios, when the handles 113 and 114 are in the open (e.g., expanded) position, the switch groove may not be aligned with the switch slot 152 and a portion 107 of the body member 105 may obstruct the path of a portion of the switch member 151, for example, the post component of the switch member 151, thereby restricting movement of the switch member 151.

In some examples, a first switch member position may correspond to an unlocked position, for example, wherein the jaw portions 111, 112 and/or the handles 113 and 114 are unlocked and distanced from one another (e.g., at one or more predetermined distances) to enable a user to insert a material for cutting between a blade 102 disposed in the blade holding mechanism 130 of a first jaw portion 111 and the platform member 116 of a second jaw portion 112. In some examples, a second switch member position may correspond to a locked position, for example, wherein the jaw portions 111, 112 and/or the handles 113 and 114 are locked in a closed position, for example, to support the cutting or clamping of a material placed between a blade 102 disposed in the blade holding mechanism 130 of a first jaw portion 111 and the platform member 116 of a second jaw portion 112. The locked position of the switch member 151 may prevent the tension component from moving the handles 113 and 114 and/or the jaw portions 111 and 112 to the open position.

In accordance with embodiments of the present invention, at least one of the handles of the utility cutter may comprise a blade drawer 160. As shown in FIGS. 1-6, the blade drawer 160 may be disposed or formed on a handle, for example, handle 114. In some examples, the handle 114 and the blade drawer 160 may be formed of a substantially similar material, for example, plastic or silicone material, which may provide a degree of elastic compliance to enable the handle 114 and the blade drawer 160 to lock together. In some examples, the handle 114 and/or the blade drawer 160 may be substantially or partially formed of a metal material, and may include compliant portions (e.g., elastic portions) which may be adapted to enable the handle 114 and the blade drawer 160 to lock together. As shown in FIG. 6, the blade drawer 160 may be configured to eject from a tip portion of the handle 114, and may be configured to retain one or more blades or similar cutting members for storage. The blade drawer 160 may comprise a substantially flat base portion 164 having one or more side walls and a handle portion 165 which may be substantially curved. In some examples, the blade drawer may be formed with a slot formed in the shape of a blade or cutting member which may be configured to substantially retain and/or secure a blade for storage purposes. As shown in FIGS. 7-8, in some scenarios, the inner surface of the blade drawer 160 may include one or more protruding portions 161 configured to abut at least a portion of a blade 102 or other cutting member placed in the blade drawer 160 for storage. In any embodiment, the protruding portions 161 may have any suitable profile shape including, for example, circular, square, rectangular (as shown in the depicted example), or trapezoidal. In some examples, the protruding portions 161 may include curves or bends. In some embodiments, handle 114 may comprise one or more depressions 162 which may be configured to indicate the location of the blade drawer 160, for example, by including a blade ejection icon 163 and/or to assist users in ejecting the blade drawer 160 from the handle 114 (e.g., to support user grip of the handle portion 165 of the blade drawer 160). It is contemplated that the blade drawer 160 may hold and/or secure at least one or multiple blades at a time. In some examples, the blade drawer 160 may be configured to slidably engage with an opening in the blade drawer 160. In some examples, the blade drawer may be partially or fully ejectable. In some examples, the blade drawer 160 may friction and/or pressure fit within a handle, for example, to prevent inadvertent ejection of the blade drawer 160 from within a blade handle.

FIGS. 9-10 generally depict exploded views of at least a portion of an exemplary blade holding mechanism in accordance with embodiments of the present invention. As shown in the depicted example, in some embodiments, a blade holding mechanism 130 may comprise a blade holder 131 comprising a blade channel 132 adapted to receive a blade 102. In some examples, the blade holding mechanism 130 may comprise a screw member 140 comprising a knob portion 141 and a shaft portion 142. In some embodiments, the blade holding mechanism may comprise a stopper member 143. In some scenarios, the blade holding mechanism may comprise a clamping plate (e.g., a pressure plate) or disc 133. In some examples, a blade holding mechanism may comprise a screw platform implement 138. One of ordinary skill in the art would appreciate that there are many suitable configurations for a blade holding mechanism, and embodiments of the present invention are contemplated for use with any such configuration.

In accordance with embodiments of the present invention, the blade channel 132 of the blade holding mechanism may comprise a first channel member 134 opposing a second channel member 135. The blade channel 132 may be adapted to receive a blade, and each channel member 134 and 135 may be formed with one or more receiving holes of varying sizes, for example, a clamping plate receiving hole 136 and/or one or more screw member receiving hole 137 (e.g., a clamping plate receiving hole 136 may be larger in size than a screw member receiving hole 137). In some examples, a clamping plate receiving hole 136 may configured to receive both a clamping plate 133 and the shaft portion 142 of the screw member 140. In some examples, one or more screw member receiving holes 137 may be formed with an internal threaded portion. In some examples, the clamping plate receiving hole 136 may correspond to the clamping plate 133, for example, may correspond in shape and size to the shape and size of the clamping plate 133. In some examples, the thickness of the clamping plate 133 and the clamping plate receiving hole 136 may be the same, or may be different (e.g., the clamping plate 133 may be more or less thick than the clamping plate receiving hole 136).

In some examples, the clamping plate 133 of the blade holding mechanism 130 may have an opening 139 adapted to receive the shaft portion 142 of the screw member 140. In some examples, the clamping plate opening 139 may be configured to travel along at least a portion of the shaft portion 142 of the screw member 140. In some examples, the clamping plate may be movable and may be configured to travel through a receiving hole, for example, a clamping plate receiving hole 136 formed in a channel member of the blade channel 132, for example, in channel member 134 or 135 of the blade channel 132. As shown in the depicted example, the clamping plate 133 may be substantially oval-shaped. In some scenarios, the clamping plate 133 may comprise a textured portion and/or a material suitable for gripping at least a portion of a blade. In some embodiments, the clamping plate 133 may comprise a material suitable for machine thread strength. For example, the clamping plate 133 may be formed of a metal material which would not strip upon application of manual force to the clamping plate 133 (e.g., against a blade 102). In any embodiment, the clamping plate 133 may be formed in any other shape, including circular, square, rectangular, or any other shape suitable to abut and/or clamp a blade 102 in the blade channel 132. In some scenarios, the clamping plate 133 may be received in a receiving hole 136 formed in the first blade channel member 134. In some examples, the clamping plate 133 may be selectively movable through the clamping plate receiving hole 136 of the first blade channel member 134, for example, to one or more clamping plate positions. In some examples, the clamping plate 133 may be movable to at least one of a blade locking position and at least one of a blade releasing position. One of ordinary skill in the art would appreciate that there are many suitable configurations for a clamping plate, and embodiments of the present invention are contemplated for use with any such configuration.

FIG. 11 depicts an exemplary screw member in accordance with embodiments of the present invention. As shown in the illustrated example, in some embodiments, the screw member 140 may comprise a knob portion 141 and a shaft portion 142. In some examples, the knob portion 141 may comprise a plurality of ridges 145 to support user grip and/or assist in rotation of the screw member 140 without the use of tools. As further shown in FIG. 11, the screw member 140 may comprise a shaft portion 142, a stopper member 143, and a threaded portion 144. In some examples, the shaft portion 142 may comprise shaft sections of varying diameters, for example, a first shaft section 146 with a larger (e.g., a slightly or significantly larger) diameter than a second shaft section 147. In some examples, a portion of the second shaft section 147 may include a threaded portion 144. In some examples, the first shaft section 146 may comprise a stopper member 143. In some examples, the stopper member 143 may be a separate member or may be formed with the shaft portion 142, for example, the first shaft section 146. In the illustrated example, the stopper member 143 is substantially round and circular. In any embodiment, the stopper member 143 may be formed in any suitable shape, for example, square, oval, rectangular, triangular, hexagonal or any other shape. In some examples, a threaded portion 144 of the second shaft section 147 may be configured to engage with an internal threaded portion of a screw member receiving hole 137 in the second blade channel member 135. In some examples, the clamping plate 133 may be disposed between the stopper member 143 and the second shaft section 147 of the screw member 140. For example, the second shaft section 147 of the screw member 140 may travel through a hole or opening (e.g., a receiving hole) 139 in the clamping plate 133, and the clamping plate 133 may be disposed anywhere along the screw member 140, for example, between an end of the second shaft section 147 and the stopper member 143 of the screw member 140. In some examples, the clamping plate 133 may be movably disposed along the second shaft section 147 of the screw member 140 (e.g., the receiving hole 139 of the clamping plate 133 may be configured to travel along the shaft portion 142 of the screw member 140).

In some examples, a screw platform implement 138 may be disposed on a jaw portion, for example, jaw portion 111. In some scenarios, the screw platform implement 138 may be formed with, affixed to, or removably attached to a jaw portion, for example, jaw portion 111. In some examples, the screw platform implement 138 may have a base portion which may be permanently or removably affixed to a surface of blade channel member 134, for example, by a screw, pin or other fastener which may be inserted into a receiving hole 182 in the screw platform implement 138. The screw platform implement 138 may have a second portion which may extend upwards from the base portion (e.g., to elevate a portion of the screw platform implement). In some scenarios, the screw platform implement 138 may have a portion with a curved profile 183. In some scenarios, the curved profile 183 may correspond to the profile of the shaft portion 142 of the screw member 140, for example, the first shaft section 146 of the screw member 140. In some examples, at least a portion of the screw platform implement 138 may be disposed near the shaft portion 142 of the screw member 140, and between the knob portion 141 and the stopper member 143. In some examples, the screw platform implement 138 may be disposed on a jaw portion 111, near the screw member 140 and may be configured as a movement boundary for the stopper member 143 and, in some examples, may prevent movement of the screw member 140 past a certain position. For example, the stopper member 143 may not be able to travel past the position of the curved profile 183 of the screw platform implement 138, such that the shaft portion 142 of the screw member 140 is prevented from dislodging from the second channel member 135. In some examples, the shaft portion 142 of the screw member 140 may be prevented from rotating too far into the blade channel 132 by the screw platform implement 138. In some examples, the screw platform implement 138 may prevent the stopper member 140 from moving to a position that would permit the clamping plate 133 to move completely out of the clamping plate receiving hole 136 in blade channel member 134 (e.g., if movement of the stopper member 143 is limited to a certain extent by the screw platform implement 138, the clamping plate 133 may be prevented from dislodging from (e.g., traveling out of) the clamping plate receiving hole 136.

In some examples, the jaw portions 111 and 112 may comprise one or more components. In some examples, the one or more components of the jaw portions 111 and 112 may collectively form a uniform member (e.g., a uniform jaw portion) or the components may be affixed to one another, for example, through the use of one or more screw fasteners 109. For example, a first blade channel 134 may be affixed (e.g., reversibly or permanently affixed) to a second blade channel member 135 by one or more screw fasteners. Also for example, the screw platform implement 138 may be attached (e.g., reversibly or permanently attached) to a jaw portion 111 by one or more screw fasteners. In any embodiment, the jaw portion components may be attached or fastened to one another using any other similarly suitable fastening means, including pins, glues or other adhesives, or any combination thereof.

In accordance with embodiments of the present invention, the blade channel 132 may be configured to accommodate multiple styles of blades 102, for example, blades formed with openings, receiving holes, indents, grooves and/or slots, for example, u-slot features, for example, commonly used four u-slot features. In some embodiments, an interior portion of the blade channel 132, for example, an interior portion of the blade channel member 135, may be formed with one or more protruding tabs 155 adapted to engage with one or more indents, grooves or u-slot features of a blade 102 to support securement of a blade 102 in the blade channel 132. In some examples, the protruding tabs 155 may correspond in shape, size and position to the indents, grooves or, slot features of a blade 102 to support securement of the blade 102 to the blade channel 132.

In accordance with an exemplary usage scenario, a multipurpose utility cutter 100 may be utilized by gripping or holding the handles 113, 114, and placing a material to be cut (e.g., cardboard, vinyl, rubber and/or plastic materials including in the form of tiles, tubing and/or wires) on a portion of the platform member 116. In some scenarios, directing the handles 113 and 114 towards one another (e.g., compressing handles 113 and 114) directs the jaw portions 111 and 112 towards one another. In some examples, a blade 102 retained in the blade channel 132 may cut a material placed on the platform member 116. In some scenarios, the handles 113 and 114 may be drawn together to draw the jaw portions 111 and 112 together (e.g., by overcoming the biasing force of the tension component), and may be selectively locked by a user in such a position, for example, to secure a material to be cut between the blade 102 and the platform member 116 such that the handles 113 and 114 may be manipulated (e.g., twisted or turned) to cut the material along a position designated by a user, without dislodging the material to be cut.

Further in an exemplary usage scenario, a blade 102 may be loaded into and secured to the blade channel 132 by placing the blade in the blade channel 132 and rotating the knob portion 141 of the screw member 140 to direct the stopper member 143 towards the clamping plate 133 to direct the clamping plate 133 towards the blade 102 inserted in the blade channel 132 until the clamping plate 133 substantially abuts a portion of the blade 102. In accordance with embodiments of the present invention the clamping member 133 may support gripping of the blade 102 within the blade channel 132 to prevent a blade 102 disposed in the blade channel 132 from dislodging. For example, the clamping plate 133 may clamp a blade 102 between the clamping plate 133 and at least an interior side wall of the blade channel member 135. In some examples, friction between the clamping plate 133 and/or the interior side wall of the blade channel member 135 may prevent the blade 102 from dislodging from within the blade channel 132. In some scenarios, a blade 102 may be removed from the blade channel 132 by counter-rotating the knob portion 141 of the screw member 140 to loosen the grip of the clamping plate 133 from the blade 102, thereby permitting the release of the blade 102.

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The invention claimed is:

1. A blade clamping mechanism comprising:

a blade holder comprising a blade channel formed with a clamping plate receiving hole and adapted to receive a blade;

a screw member comprising a knob portion and a shaft portion, the shaft portion comprising a stopper member and a threaded portion; and a clamping plate having an opening adapted to receive and travel along a portion of the shaft portion, the clamping plate adapted to travel through the clamping plate receiving hole.

2. The blade clamping mechanism of claim 1, wherein the stopper member is between the threaded portion and the knob portion.

3. The blade clamping mechanism of claim 1, wherein an inner face of the clamping plate is configured to selectively abut a portion of the blade in the blade holder to retain the blade between the clamping plate inner face and an interior portion of the blade channel.

4. The blade clamping mechanism of claim 1, wherein the position of the stopper member is adjustable relative to the blade channel, making the stopper member moveable to at least a first stopper position wherein the stopper member presses against the clamping plate to secure the blade within the blade channel.

5. The blade clamping mechanism of claim 1, wherein rotation of the screw member directs the stopper member towards the clamping plate and the clamping plate towards an opposing interior sidewall of the blade channel to clamp the blade.

6. A blade holding mechanism comprising:

a blade holder comprising a first channel member opposing a second channel member to form a blade channel adapted to receive a blade, at least one of the channel members formed with a clamping mechanism receiving hole; and a clamping mechanism comprising:

- a screw member comprising a knob portion and a shaft portion, the shaft portion comprising a stopper member and a threaded portion, the shaft portion adapted to travel through the clamping mechanism receiving hole; and
- a clamping plate disposed between the stopper member and the threaded portion and having a shaft portion opening configured to receive and travel along a portion of the shaft portion.

7. The blade holding mechanism of claim 6, wherein the threaded portion of the shaft portion is adapted to threadably engage with a screw member receiving hole in the second channel member.

8. The blade holding mechanism of claim 7, wherein rotation of the screw member and engagement of the threaded portion and the screw member receiving hole of the second channel member directs the stopper member of the shaft portion towards the second channel member, thereby directing the clamping plate towards the second channel member to clamp the blade disposed in the blade holder.

9. The blade holding mechanism of claim 7, wherein a screw platform implement is disposed on the first channel member and a portion of the screw platform implement is disposed between the knob portion and the stopper member of the screw member, the screw platform implement configured to prevent the threaded portion of the screw member from unthreading from the screw member receiving hole.

10. The blade holding mechanism of claim 6, wherein rotation of the screw member directs the stopper member of the shaft portion directs towards the clamping plate, to move the clamping plate through a receiving hole in the first channel member and towards the second channel member, to abut and secure the blade within the blade channel.

11. The blade holding mechanism of claim 6, wherein compression of the clamping plate against a portion of the blade prevents dislodgement of the blade from within the blade channel.

12. The blade holding mechanism of claim 6, wherein the clamping plate is of a thickness to maintain contact with an internal portion of a clamping plate receiving hole of the first channel member while the clamping plate clamps the blade disposed in the blade channel.

13. The blade holding mechanism of claim 6, wherein an internal sidewall of the blade channel comprises one or more protruding elements adapted to mate with one or more indents formed on a spine side of the blade.

14. The blade holding mechanism of claim 6, wherein the shaft portion comprises a first shaft section with a first diameter and a second shaft section with a second diameter which is smaller than the first diameter, and the stopper member is disposed on the first shaft section and the clamping plate is disposed on the second shaft section.

15. A multi-purpose tool comprising:

a pair of body members rotatably connected at a pivot point to form a pair of jaw portions and a pair of handles, with at least one of the jaw portions formed with a blade holding mechanism comprising:

a blade holder comprising a first channel member opposing a second channel member to form a blade channel adapted to receive a blade, each channel member formed with one or more receiving holes;

a screw member comprising a knob portion and a shaft portion, the shaft portion comprising a stopper member and a threaded portion; and a clamping plate having a shaft portion opening configured to receive and travel along a portion of the shaft portion.

16. The multi-purpose tool of claim 15, wherein the clamping plate is movably disposed on the screw member between the stopper member and the threaded portion of the shaft portion.

17. The multi-purpose tool of claim 15, wherein the shaft portion stopper member directs movement of the clamping plate through a clamping plate receiving hole of the first channel member and towards an internal sidewall of the second channel member.

18. The multi-purpose tool of claim 15, wherein rotation of the screw member directs the stopper member towards the clamping plate to move the clamping plate to compress a portion of the blade disposed in the blade channel to secure the blade within the blade channel.

19. The multi-purpose tool of claim 15, wherein the clamping plate is of a thickness to maintain contact with an internal portion of a clamping plate receiving hole of the first channel member ssss while the clamping plate clamps the blade disposed in the blade channel.

20. The multi-purpose tool of claim 15, wherein at least one handle of the pair is formed with a blade drawer opening adapted to receive a blade drawer configured to store one or more blades.

* * * * *